United States Patent [19]
Kubes et al.

[11] Patent Number: 5,971,557
[45] Date of Patent: Oct. 26, 1999

[54] LEP ELECTROLUMINESCENT BACKLIT KEYPAD FOR A CELLULAR PHONE

[75] Inventors: Joseph Kubes, Raleigh; James A. Smith, Durham, both of N.C.

[73] Assignee: Ericsson Inc., Research Triangle Park, N.C.

[21] Appl. No.: 08/747,846

[22] Filed: Nov. 13, 1996

[51] Int. Cl.[6] .................................................. H04M 1/22
[52] U.S. Cl. .............................. 362/24; 362/84; 362/88; 362/109; 313/506
[58] Field of Search .................................... 313/505, 506, 313/503, 510; 362/84, 88, 109, 253, 24

[56] References Cited

U.S. PATENT DOCUMENTS

| | | | |
|---|---|---|---|
| 4,613,793 | 9/1986 | Panicker et al. | 315/169.3 |
| 4,614,668 | 9/1986 | Topp et al. . | |
| 4,665,342 | 5/1987 | Topp et al. . | |
| 4,758,830 | 7/1988 | Levien et al. | 340/712 |
| 5,008,579 | 4/1991 | Conley et al. . | |
| 5,097,396 | 3/1992 | Myers . | |
| 5,124,610 | 6/1992 | Conley et al. . | |
| 5,149,923 | 9/1992 | Demeo . | |
| 5,235,232 | 8/1993 | Conley et al. . | |
| 5,384,459 | 1/1995 | Patino et al. . | |
| 5,397,867 | 3/1995 | Demeo . | |
| 5,510,782 | 4/1996 | Norris et al. . | |
| 5,565,733 | 10/1996 | Krafcik et al. | 313/510 |

FOREIGN PATENT DOCUMENTS

| | | |
|---|---|---|
| 0 644 564 A1 | 3/1995 | European Pat. Off. . |
| WO 94/14180 | 6/1994 | WIPO . |

OTHER PUBLICATIONS

Philips Mobile Computing Group, "*Velo, an Exploration into Mobile Computing Brochure*".

*Primary Examiner*—Sandra O'Shea
*Assistant Examiner*—Marshall Honeyman
*Attorney, Agent, or Firm*—Jenkens & Gilchrist, a Professional Corporation

[57] ABSTRACT

An electroluminescent backlit device utilizing light-emitting polymers (LEP) is disclosed. A sandwich of LEP material and two electrical conductive materials are used to provide back lighting for a keypad or display. The electrical conductive layers are etched to form channels which provide current to and excite the LEP material to produce light at predetermined points. The etchings are directed around existing electrical contacts to facilitate normal operation of the underlying host system, such as a cellular telephone.

18 Claims, 3 Drawing Sheets

LEP ELECTROLUMINESCENT BACKLIT KEYPAD FOR A CELLULAR PHONE

BACKGROUND OF THE INVENTION

1. Technical Field of the Invention

The present invention relates to input devices, such as keypads and keyboards, as well as to displays and the like, and in particular, to backlit keypads, keyboards and displays utilizing electroluminescent polymers.

2. Description of Related Art

Backlit input devices, such as keypads and keyboards, and displays are known in the art. These devices typically include a light source transmitted either through or underneath a pad or board including operation keys, such as those found on a typewriter or ten-keypad, to provide an optical contrast against the keys. Applications for such backlit input devices include uses in persistent low-light environments (e.g., air traffic controller booth, submarine) and in devices capable of use at night or indoors (e.g., cellular telephone).

Prior art backlit input devices include keypads of generally two types: devices where the keys are constructed from light-transmitting material and devices where conduits or channels are used to conduct light from a source to the keys. In the former, the keys and underlying pad or board are typically molded as a single piece and then placed over or adjacent to a light source. In the latter example, devices in which conduits or channels are used to transmit light from a source to the keys, conduits such as fibers offer tight control over the level of light transmitted. Backlit displays include traditional light-emitting diode (LED) displays, liquid crystal displays(LCD), and the like.

Regardless of the type of construction, however, the light source for the prior art devices is typically separated from the keys or display surface, requiring additional space in which to store the light source and the mechanism for transmitting light from the source to the keys or display surface. This separation also requires a relatively powerful light source so that the keys and/or display surface are sufficiently backlit despite the loss of some of the light during transmission from the source. Stronger light sources typically require additional space, increased power requirements and generate excess heat, all adversely affecting design options for such device. The need for access to the traditional light sources (e.g., for replacing or maintaining the light source) used in prior art devices presents additional design limitations.

Thus, a backlit input device, such as a keypad or keyboard, having a light source which is closely associated with the keys, utilizes a relatively low powered light source, and does not require special space and/or design limitations, is desired. The prior art of backlit keypads, keyboards and displays does not suggest that a backlit device having a light source which is closely associated with the keys or display surface, uses a relatively small amount of space and power, and not requiring conduits or channels to transmit the light from the source to the keys or display surface, is possible.

SUMMARY OF THE INVENTION

The present invention comprises a electroluminescent backlit device, such as a key pad, keyboard or display, which utilizes one or more light-emitting polymers (LEP) as a light source to back light the keys or display surface, thus virtually eliminating the relatively large and expensive space and energy requirements of prior art light sources.

The electroluminescent backlit device of the present invention comprises a clear or translucent keyboard, keypad or display surface coated with one or more layers or a LEP material sandwiched between one or more layers of an appropriate electrical conductive material. The electrical conductive layers are attached at the edges of the keypad or display surface to a low voltage power supply.

The electrical conductive layers are etched perpendicular to one another to form "wires" through which electricity is conducted along such layers. At points in the layers where the "wires" cross, a circuit is formed, producing a light-emitting point in the layer. At these light-emitting points, the LEP material is excited and light is emitted. Polymers exhibiting light of various colors in the visual spectrum are used singly or in combination to produce a wide variety of colors.

Since oxygen and moisture negatively affect the performance of the LEP material, the keys or display surface are sealed against such elements with a clear or translucent coating. Sealed breaks in the coating allow the electrical conductors to connect with the power supply.

The use of a light source (LEP) so closely associated with the keys or display surface facilitates the design of a backlit keypad, keyboard or display exhibiting reduced space limitations. Additionally, while achieving comparable light levels with LED and LCD technologies, the LEP are low voltage and produce very little heat.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
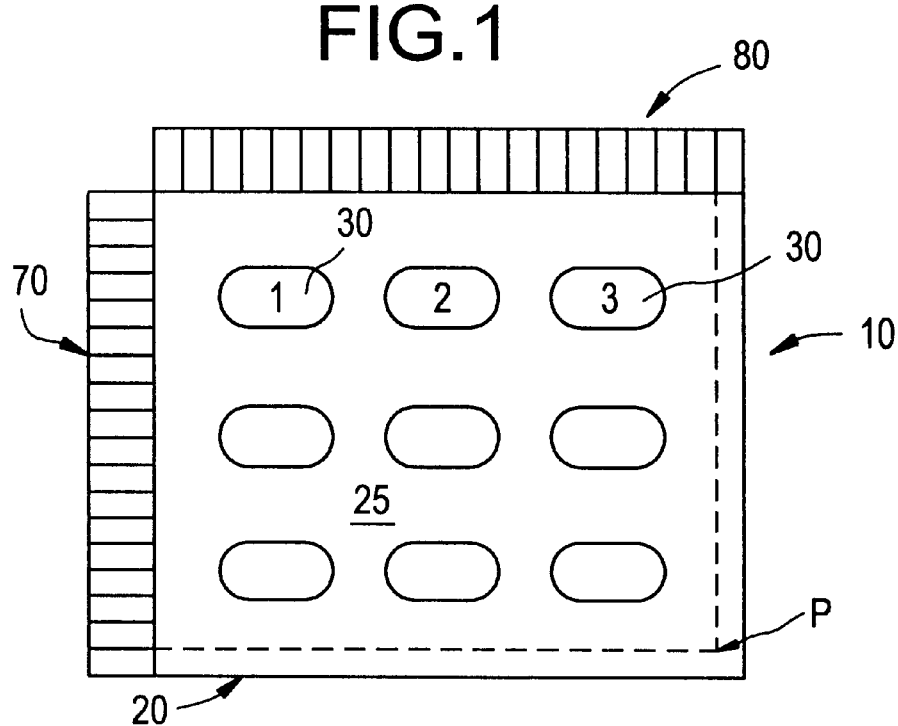
FIG. 1 is a top view of an embodiment of the electroluminescent backlit keypad of the present invention.
Figure 2:
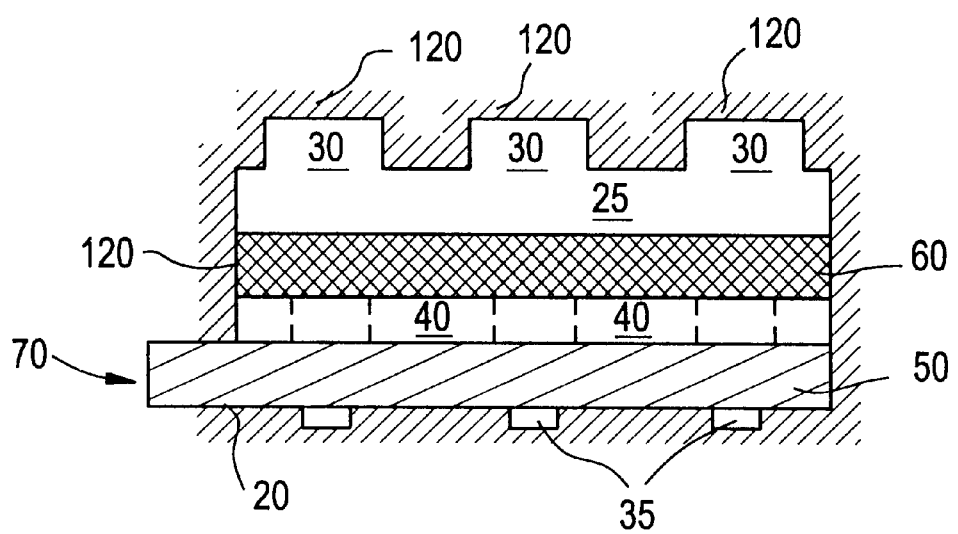
FIG. 2 is a side view, in cross section, of the keys of an embodiment of the electroluminescent backlit keypad of the present invention.

FIG. 1 is a top view of an embodiment of the electroluminescent backlit keypad 10 of the present invention. The electroluminescent backlit keypad 10 comprises a substrate material 20, a keypad 25 including a variety of keys 30 and electrical circuitry contacts 35 (FIG. 2). The electrical circuitry contacts 35 are associated with each of the keys 30 of the keypad 25 and communicate to the electrical circuitry which key 30 has been depressed.

In a preferred embodiment, the keys 30 are formed within the keypad 25 and are of a clear or translucent material. This type of keypad 25 can be thermomolded or prepared using other techniques known in the art. Although the keys 30 are molded within the keypad 25 in a preferred embodiment, it is noted that the keys 30 could be separately formed of the same or other appropriate material and subsequently joined with the keypad 25. The substrate material can be any suitable material, such as fiberglass, polyamide, polycarbonate, fluoro-halo carbon, or similar material.

As illustrated in FIG. 2, between the substrate material 20 and the keypad 25 are a light-emitting polymer (LEP) layer 40 sandwiched between a first electrical conductive layer 50 and a second electrical conductive layer 60. Any suitable LEP can be used in the LEP layer 40. Examples of such suitable polymers are available from Electromaterials Corporation of America, Mamaroneck, N.Y. and Amersham International plc, Buckinghamshire, England.

The first conductive layer 50 is located beneath the LEP layer 40 and at an edge includes a connector tab 70. The connector tab 70 connects the first conductive layer 50 to a power supply (not shown). The first conductive layer 50 is composed of any suitable electrically conductive material and is preferably composed of aluminum (Al). The first conductive layer 50 is etched (dashed lines in FIG. 1) to form first channels 90 which act like "wires" (i.e., they conduct electricity) along the surface of the first conductive layer 50. As illustrated in FIG. 2, the first channels 90 are shown in the plane of the paper.

The second conductive layer 60 is located above the LEP layer 40 and, like the first conductive layer 50, also includes a connector tab 80 (FIG. 1) at its edge which connects the second conductive layer 60 to a power supply (not shown). The second conductive layer 60 is also composed of any suitable electrically conductive material, and is preferably composed of indium tin oxide (ITO).

Like the first conductive layer 50, the second conductive layer 60 is also etched along its surface to form second channels 100("wires") in its surface. The second channels 100 of the second conductive layer 60 are etched to run in the direction perpendicular to the direction of the first channels 90 etched into the first conductive layer 50.

In other words, the etched channels of the two conductive layers form a matrix of squares when viewed from the top or bottom due to the perpendicular direction of the channels. As illustrated in FIG. 2, the second channels 100 are shown in a direction into the plane of the paper) The first and second channels are preferably etched using lasers, but can be formed by any suitable method, such as stereolithography or physical masking, if desired.

Figure 3:
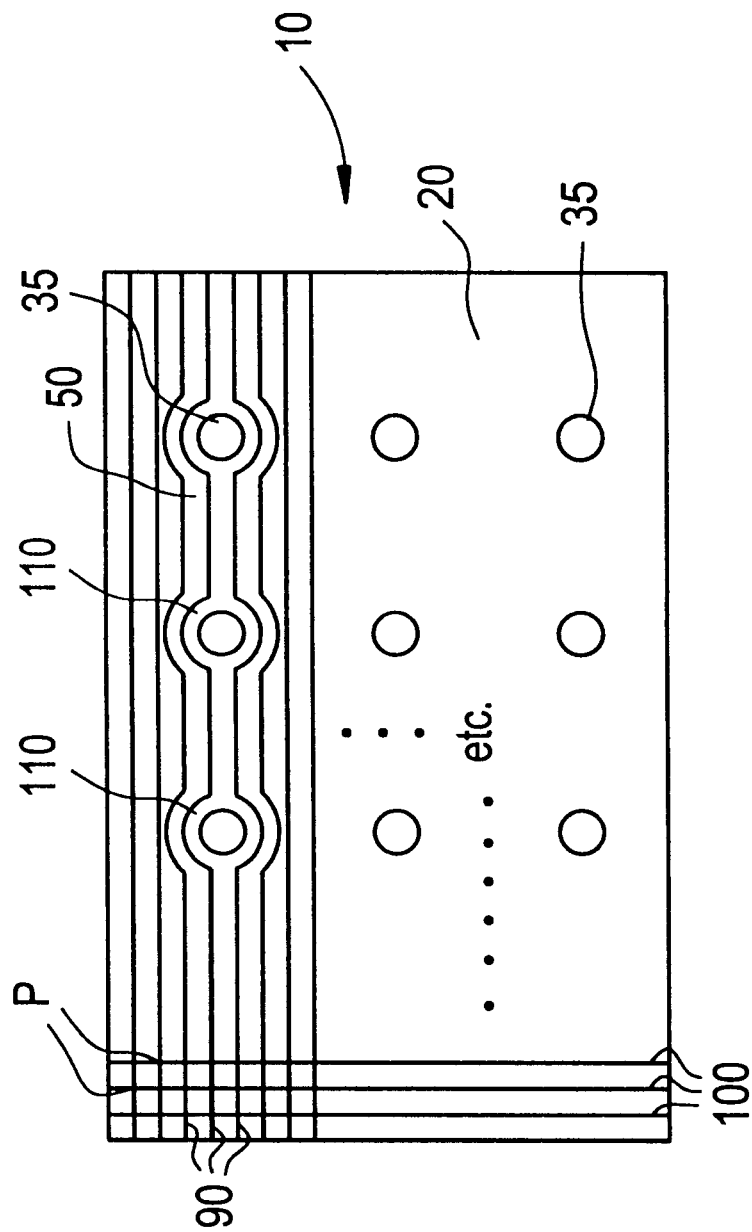
FIG. 3 is a bottom view of the electroluminescent backlit keypad of the present invention illustrating the electrical connection dimples formed in the layers.

As illustrated in FIG. 3, where the first channels 90 of the first conductive layer 50 and the second channels 100 of the second conductive layer 60 cross (i.e., overlap), a light-emitting point (P) is formed. It is at this point P where the current provided by the power supply to the first conductive layer 50 and the second conductive layer 60 will excite the LEP layer 40 to produce light. A field of such points P will provide a field of uniform light to back light the keys 30 of the keypad 25. The greater number of points P along the LEP layer 40, the more uniform the field of light produced.

Importantly, as illustrated in FIG. 3, the first channels 90 of the first conductive layer 50 must accommodate the electrical circuitry contacts 35 of the keypad 25. As previously discussed, these electrical circuitry contacts 35 communicate with the electronics of the underlying system (e.g., telephone, calculator) to identify a key 30 when it is depressed. Thus, for example, when the number 2 key 30 is depressed, the electrical circuitry contact 35 associated with the number 2 key 30 is brought into physical contact with a connection point linked to the electronics of the underlying system to identify the key 30 depressed as the number 2 key 30. Accordingly, the first channels 90 must be etched to avoid the electrical circuitry contacts 35, forming dimples 110 in the bottom surface of the substrate material 20. The dimples 110 allow the first channels 90 to conduct electricity across the surface of the substrate material 20 to excite the LEP layer 40 and provide light and also allow the electrical circuitry contacts 35 to properly operate to identify key strokes made on the keypad 25.

Although the first conductive layer 50 and the second conductive layer 60 have been described as being composed of Al and ITO, respectively, it is noted that any suitable conductive material (i.e., having an appropriate dielectric constant) can be used, if desired. Preferably, the first conductive layer 50 is substantially reflective and the second conductive layer 60 is transparent or translucent in nature so as to direct light up through the keypad or display device.

In a preferred embodiment, the various layers (first conductive layer 50, LEP layer 40 and the second conductive layer 60) are print screened one on top of each other on the bottom surface of the keypad 25. In another embodiment, the layers are formed using vacuum deposition techniques known in the art. Additionally, although the preferred embodiment describes and illustrates a single first conductive layer 50, a LEP layer 40 (typically including two LEP layers) and a single second conductive layer 60, it is noted that any number of layers of each of these layers, or combinations thereof, can be used, if desired. For example, it is noted that the two or more layers of LEP material, coupled with associated conductive layers, are used to achieve various colors of emitted light.

Referring again to FIG. 2, a clear or translucent coating 120 seals the outer surface of the keypad 25 and the substrate material 20 so as to seal the layers from exposure to moisture and oxygen. These elements adversely affect the performance of LEP materials. The connection tabs 70 and 80 and the electric circuitry contacts 35 are sealed at their edges so that layers remain protected while electrical contact between the components and external electrical components, such as the power supply, can still be made.

Figure 4A:
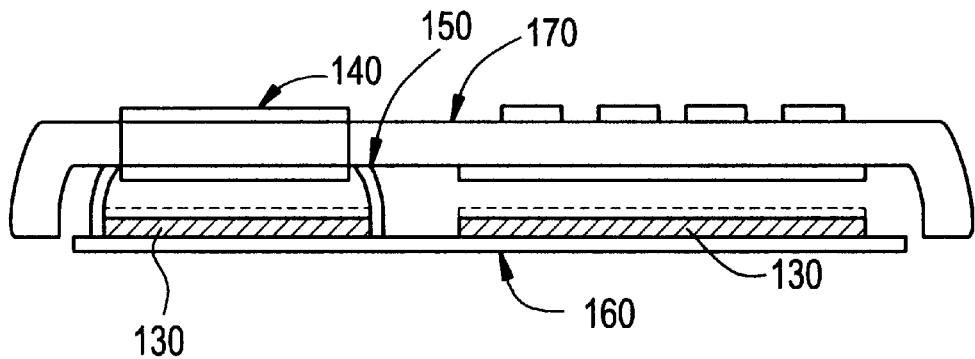
FIG. 4 is a series of side views in partial cross-section of traditional displays incorporating in different ways the LEP layers of the present invention.
Figure 4B:
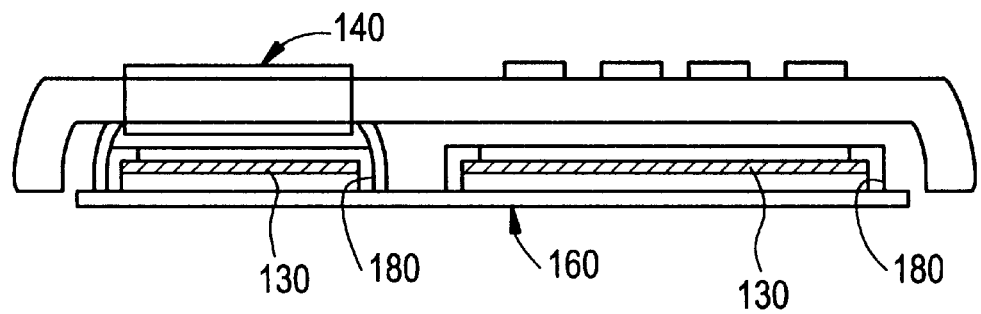
Figure 4C:
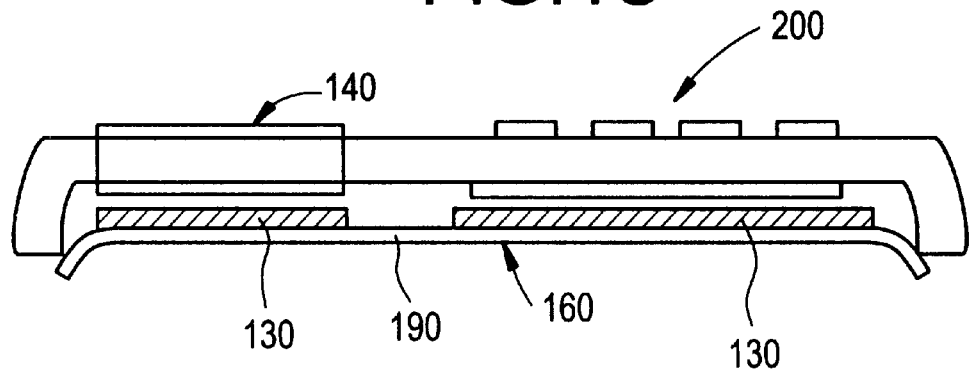

As illustrated in FIG. 4 (a), the LEP sandwich 130 (i.e., conductive layers including LEP) can be incorporated to an electronic device having a display 140, a display support 150, a PC board 160 and a cover 170. The LEP sandwich 130 is applied directly on the PC board 160. Using this application method, the PC board 160 provides a seal to protect one side of the LEP sandwich 130 against exposure to oxygen and/or moisture. The LEP sandwich 130 is preferably encapsulated in a material impervious to oxygen and moisture to protect the LEP material. In FIG. 4(b), use of the LEP sandwich 130 as a stand alone component is illustrated. A support 180 is affixed to the PC board 160 and the LEP sandwich 130 is applied to the support 180 such that the LEP sandwich 130 is located directly beneath the display 140 and provides backlighting for said display 140. Here, although the support 180 provides to the LEP sandwich 130 partial protection from exposure to moisture and/or oxygen, the LEP sandwich 130 is preferably encapsulated for complete protection from detrimental external elements. In FIG. 4(c) the LEP sandwich 130 is applied directly to a flex film 190 associated with the PC board 160. Here, the LEP sandwich 130 is sealed in the flex film 190 to prevent exposure to oxygen and/or moisture and is placed both below the display 140 and a keypad 200. In this way, a single LEP sandwich 130 provides backlighting for two devices, reducing the number of light sources, and thus overall size, required.

Numerous other applications and application methods are apparent to those skilled in the art. Additionally, the LEP sandwich can be integrated easily with other technologies, including without limitation, touch-screen technology, if desired.

Although preferred embodiments of the apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An electroluminescent keypad for use with a host system including electrical components, comprising:

a substrate material;

a keypad including at least one key;

at least one layer of light-emitting polymer material;

a first layer of electrical conductive material connected to a power supply and located along a bottom surface of the layer of light-emitting polymer material;

a second layer of electrical conductive material connected to the power supply and located along a top surface of the layer of light-emitting polymer material;

said first layer of electrical conductive material and said second layer of electrical conductive material providing current to the layer of light-emitting polymer material at predetermined points, causing said layer of light-emitting polymer material to produce light at such predetermined points;

said first electrical conductive layer etched along its surface in a first direction to form a first set of channels and said second electrical conductive layer etched along its surface in a direction perpendicular to said first direction to form a second set of channels, said first set and said second set of channels capable of conducting electricity along said channels; and wherein said first set of channels and said second set of channels are etched to avoid interrupting electrical contact between said at least one key and said electrical components of the host system.

2. The electroluminescent keypad of claim 1, wherein the predetermined points at which the layer of light-emitting polymer material will produce light are defined by points on the layer of light-emitting polymer material where the first set of channels along the bottom surface of the layer of light-emitting polymer material intersect with the second set of channels along the top surface of the layer of light-emitting polymer material.

3. The electroluminescent keypad of claim 1, wherein the substrate material is selected from the group consisting of plastic, fiberglass, polyamide, polycarbonate or fluorohalo carbon.

4. The electroluminescent keypad of claim 1, wherein the keypad is constructed of a clear or translucent material.

5. The electroluminescent keypad of claim 1, wherein the first layer of electrical conductive material is composed of aluminum.

6. The electroluminescent keypad of claim 1, wherein the second layer of electrical conductive material is composed of indium tin oxide.

7. The electroluminescent keypad of claim 1, wherein the layer of light-emitting polymer material, the first layer of electrical conductive material and the second layer of electrical conductive material are formed using a print screen technique.

8. The electroluminescent keypad of claim 1, wherein the layer of light-emitting polymer material, the first layer of electrical conductive material and the second layer of electrical conductive material are formed using a vacuum deposition technique.

9. The electroluminescent keypad of claim 1, wherein the at least one layer of light-emitting polymer material further includes a coating of material to seal the at least one layer of light-emitting polymer material against exposure to moisture and oxygen.

10. The electroluminescent keypad of claim 1, wherein the host system is a personal communication device.

11. The electroluminescent keypad of claim 10, wherein the personal communication device is a cellular telephone.

12. An electroluminescent display for use with a host system, said host system including electrical components, said electroluminescent display comprising:

a substrate material;

a display surface;

at least one light-emitting polymer (LEP) layer;

a first electrical conductive material (ECM) layer connected to a power supply and located along a bottom surface of the at least one LEP layer, said first ECM layer including a first set of channels etched in a first direction into the its surface, said first set of channels capable of conducting electricity along their length;

a second ECM layer connected to the power supply and located along a top surface of the at least one LEP layer, said second ECM layer including a second set of channels etched in a direction perpendicular to the first direction, said second set of channels capable of conducting electricity along their length;

said first set of channels and said second set of channels crossing at a multiplicity of predetermined points along the LEP layer;

said first ECM layer and said second ECM layer providing current to the at least one LEP layer at the predetermined points on its surface, causing said at least one LEP layer to produce light at such predetermined points; and wherein said first set of channels and said second set of channels are etched to avoid interrupting electrical contact between said electrical components of the host system.

13. The electroluminescent display of claim 12, wherein the first ECM layer is composed of aluminum.

14. The electroluminescent display of claim 12, wherein the second ECM layer is composed of indium tin oxide.

15. The electroluminescent display of claim 12, wherein the first ECM layer is composed of a material having a high dielectric constant.

16. The electroluminescent display of claim 12, wherein the second ECM layer is composed of a material having a low dielectric constant.

17. The electroluminescent display of claim 12, wherein the host system is a cellular telephone.

18. The electroluminescent display of claim 12, wherein the display surface is composed of a clear or translucent material.

* * * * *

UNITED STATES PATENT AND TRADEMARK OFFICE
CERTIFICATE OF CORRECTION

PATENT NO. : 5,971,557  
DATED : October 26, 1999  
INVENTOR(S) : Kubes et al.

Page 1 of 1

It is certified that error appears in the above-identified patent and that said Letters Patent is hereby corrected as shown below:

<u>Title page,</u>  
Item [54], Title, please amend the title page as follows:  
Replace "LEP ELECTROLUMINESCENT BACKLIT KEYPAD FOR A CELLULAR PHONE"  
With -- ELECTROLUMINESCENT BACKLIT KEYPAD --

Signed and Sealed this

Fifth Day of February, 2002

Attest:

*Attesting Officer*

JAMES E. ROGAN  
*Director of the United States Patent and Trademark Office*